United States Patent
Takahashi et al.

(10) Patent No.: US 11,884,812 B2
(45) Date of Patent: Jan. 30, 2024

(54) HYDROGENATED BLOCK COPOLYMER

(71) Applicant: KURARAY CO., LTD., Kurashiki (JP)

(72) Inventors: Naoto Takahashi, Kamisu (JP); Yusuke Nojima, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 602 days.

(21) Appl. No.: 17/256,513

(22) PCT Filed: Jun. 28, 2019

(86) PCT No.: PCT/JP2019/025862
§ 371 (c)(1),
(2) Date: Dec. 28, 2020

(87) PCT Pub. No.: WO2020/004631
PCT Pub. Date: Jan. 2, 2020

(65) Prior Publication Data
US 2021/0277224 A1      Sep. 9, 2021

(30) Foreign Application Priority Data

Jun. 29, 2018 (JP) ................................ 2018-125338
Dec. 27, 2018 (JP) ................................ 2018-245574

(51) Int. Cl.
| | |
|---|---|
| C08L 53/02 | (2006.01) |
| B32B 27/08 | (2006.01) |
| C08F 8/04 | (2006.01) |
| C08F 112/08 | (2006.01) |
| C08F 136/06 | (2006.01) |
| C08F 136/08 | (2006.01) |
| C08L 23/12 | (2006.01) |
| C08L 23/14 | (2006.01) |
| C08L 23/06 | (2006.01) |

(52) U.S. Cl.
CPC ............ *C08L 53/025* (2013.01); *B32B 27/08* (2013.01); *C08F 8/04* (2013.01); *C08F 112/08* (2013.01); *C08F 136/06* (2013.01); *C08F 136/08* (2013.01); *C08L 23/06* (2013.01); *C08L 23/12* (2013.01); *C08L 23/14* (2013.01); *B32B 2250/02* (2013.01); *B32B 2250/03* (2013.01); *B32B 2250/24* (2013.01); *B32B 2307/31* (2013.01); *B32B 2307/732* (2013.01); *B32B 2439/46* (2013.01); *B32B 2439/80* (2013.01); *C08L 2203/02* (2013.01); *C08L 2203/162* (2013.01)

(58) Field of Classification Search
CPC ........ C08L 53/025; C08L 23/12; C08L 23/16; C08L 23/14; C08L 2203/02; C08L 2203/162; B32B 2439/80; B32B 27/08; B32B 2250/02; B32B 2250/03; B32B 2250/24; B32B 2307/732; B32B 2307/31; B32B 2430/46; C08F 136/06; C08F 136/08; C08F 112/08; C08F 8/04
USPC .......................................................... 524/505
See application file for complete search history.

(56) References Cited

U.S. PATENT DOCUMENTS

| | | |
|---|---|---|
| 2003/0187137 A1 | 10/2003 | Handlin, Jr. et al. |
| 2013/0015071 A1 | 1/2013 | Willis |
| 2015/0344684 A1 | 12/2015 | Kusanose et al. |
| 2016/0287474 A1 | 10/2016 | Tanaka et al. |
| 2017/0042766 A1 | 2/2017 | Nojima et al. |
| 2018/0237556 A1 | 8/2018 | Ichino et al. |

FOREIGN PATENT DOCUMENTS

| | | |
|---|---|---|
| EP | 1 492 830 A1 | 1/2005 |
| JP | 11-130828 A | 5/1999 |
| JP | 2001-240636 A | 9/2001 |
| JP | 2009-149861 A | 7/2009 |
| JP | 2014-520928 A | 8/2014 |
| JP | 2016-155604 A | 9/2016 |
| JP | 2016-196643 A | 11/2016 |
| JP | WO 2017/033987 A1 | 3/2018 |

OTHER PUBLICATIONS

Extended European Search Report dated Mar. 2, 2022 in European Patent Application No. 19824530.0, 6 pages.
International Search Report dated Oct. 1, 2019 in PCT/JP2019/025862 filed Jun. 28, 2019, 1 page.

*Primary Examiner* — Hui H Chin
(74) *Attorney, Agent, or Firm* — Oblon, McClelland, Maier & Neustadt, L.L.P.

(57) ABSTRACT

A hydrogenated block copolymer containing polymer blocks (A1) and (A2) each mainly containing an aromatic vinyl compound-derived structural unit and polymer blocks (B) and (C) each mainly containing a conjugated diene compound-derived structural unit, at least one of the polymer blocks (B) and (C) being present between the polymer blocks (A1) and (A2), the hydrogenated block copolymer having a total content of the polymer blocks (A1) and (A2) of 5 to 30% by mass, a 3,4-bond and 1,2-bond content in the polymer block (B) of 1 to 40% by mole, a 3,4-bond and 1,2-bond content in the polymer block (C) of 50 to 100% by mole, and a mass ratio $[(C)/\{(B)\pm(C)\}]$ of the polymer block (C) to the sum of the polymer blocks (B) and (C) of 26/100 to 63/100.

15 Claims, No Drawings

HYDROGENATED BLOCK COPOLYMER

TECHNICAL FIELD

The present invention relates to a hydrogenated block copolymer, a resin composition, a film for a liquid-packaging container, a liquid-packaging container, and a medical tool.

BACKGROUND ART

As a medical liquid-packaging container, such as, for example, an infusion bag, a container of glass, plastic, or the like is used. A liquid medicine injected into an infusion bag is sealed therein and is then generally sterilized by a method, such as steam sterilization or autoclave sterilization. Since glass containers have problems of being heavier and more easily broken by a shock or a fall in transportation than plastic containers, plastic infusion bags are widely used.

As a plastic infusion bag, a bag of a soft vinyl chloride resin or a bag of a polyolefin, such as polyethylene or polypropylene, is used. In an infusion bag of a soft vinyl chloride resin, since a large amount of a plasticizer is incorporated for imparting softness, the plasticizer may be eluted into the infusion depending on the type of the infusion, and thus a problem in a safety aspect is pointed out. In addition, since a medical tool is discarded once it is used, an infusion bag of a soft vinyl chloride resin is also incinerated after use, leading to a problem of generation of a toxic gas derived from the soft vinyl chloride resin. An infusion bag of a polyolefin, such as polyethylene or polypropylene, which contains no plasticizer, is preferred in a hygiene aspect. However, such a bag has low softness and insufficient shock resistance, and thus is not sufficient in terms of handleability.

On the other hand, PTL 1 proposes, for the purpose of enhancing the softness, sealing property, and blocking resistance, a medical multilayer film in which a polypropylene-based resin composition is used as a sealing layer (inner layer), the polypropylene-based resin composition containing 50 to 98% by mass of a crystalline polypropylene-based resin, 1 to 49% by mass of a certain ethylene-α-olefin copolymer, and 1 to 49% by mass of a certain hydrogenated block copolymer.

PTL 2 proposes, as a liquid-packaging container which is superior in the softness, transparency, high heat sealing strength, bag-breaking strength, and the like, a liquid-packaging container formed of a laminate body having at least three layers including an inner layer of a resin composition (Y), an intermediate layer of a resin composition (X), and an outer layer of a resin composition (Z), the liquid-packaging container being characterized in that each of the resin compositions contains a certain polypropylene-based resin and a certain thermoplastic elastomer.

CITATION LIST

Patent Literature

PTL 1: JP 2009-149861 A
PTL 2: JP 2016-155604 A

SUMMARY OF INVENTION

Technical Problem

Although the multilayer film and the liquid-packaging container disclosed in PTL 1 to 2 are superior in the softness, further improvement is desired in the bag-breaking strength.

Thus, an object of the present invention is to provide a hydrogenated block copolymer that is suitable for a film for a liquid-packaging container having high bag-breaking strength which is important in a medical liquid-packaging container. Another object of the present invention is to provide a resin composition containing the hydrogenated block copolymer, and a film for a liquid-packaging container, a liquid-packaging container, and a medical tool that are produced by using the resin composition.

Solution to Problem

As a result of intensive and extensive studies, the present inventors have found that a hydrogenated block copolymer that has, in a certain order, two polymer blocks each mainly containing an aromatic vinyl compound-derived structural unit and two polymer blocks each mainly containing a conjugated diene compound-derived structural unit having a 3,4-bond and 1,2-bond content in a certain range, forms a phase having a fine dispersion diameter in a resin composition containing the hydrogenated block copolymer and a polyolefin-based resin in mixture. Furthermore, they have also found that, when a resin composition has a phase of a fine dispersion diameter, cohesive fracture more easily occurs than interfacial peeling and film fracture in a film produced by using the resin composition, resulting in enhanced bag-breaking strength, thus completing the present invention.

The present invention is directed to the following [1] to [15].

[1]. A hydrogenated block copolymer containing polymer blocks (A1) and (A2) each mainly containing an aromatic vinyl compound-derived structural unit and polymer blocks (B) and (C) each mainly containing a conjugated diene compound-derived structural unit, at least one of the polymer blocks (B) and (C) being present between the polymer blocks (A1) and (A2), the hydrogenated block copolymer having a total content of the polymer blocks (A1) and (A2) of 5 to 30% by mass, a 3,4-bond and 1,2-bond content in the polymer block (B) of 1 to 40% by mole, a 3,4-bond and 1,2-bond content in the polymer block (C) of 50 to 100% by mole, and a mass ratio [(C)/{(B)±(C)}] of the polymer block (C) to the sum of the polymer blocks (B) and (C) of 26/100 to 63/100.

[2] The hydrogenated block copolymer according to [1], wherein the hydrogenated block copolymer is constituted of four blocks of the polymer blocks (A1) and (A2) and the polymer blocks (B) and (C).

[3] The hydrogenated block copolymer according to [1] or [2], wherein the polymer blocks (A1) and (A2) and the polymer blocks (B) and (C) are present in an order of (A1)-(B)-(A2)-(C).

[4] The hydrogenated block copolymer according to any one of [1] to [3], wherein the hydrogenated block copolymer has a weight average molecular weight of 60,000 to 500,000.

[5] A resin composition (Z) containing a hydrogenated block copolymer (X) that is the hydrogenated block copolymer according to any one of [1] to [4] and a polypropylene-based resin (Y), the hydrogenated block copolymer (X) and the polypropylene-based resin (Y) satisfying the following condition:

<Condition> when 30 parts by mass of the hydrogenated block copolymer (X) and 70 parts by mass of the polypropylene-based resin (Y) are kneaded under conditions of 230°

C. and a shear rate of 30 to 150 s$^{-1}$, a sea-island structure in which the hydrogenated block copolymer (X) is a dispersed phase is formed, the dispersed phase having a size of 0.1 μm or more and 1.0 μm or less.

[6] A resin composition (Z) containing a hydrogenated block copolymer (X) that is the hydrogenated block copolymer according to any one of [1] to [4] and a polypropylene-based resin (Y), the resin composition (Z) having a mass ratio [(Y)/{(X)+(Y)}] of the polypropylene-based resin (Y) to the sum of the hydrogenated block copolymer (X) and the polypropylene-based resin (Y) of 61/100 to 95/100.

[7] The resin composition according to [5] or [6], wherein the hydrogenated block copolymer (X) has a viscosity ($\eta_{(X)}$) and the polypropylene-based resin (Y) has a viscosity ($\eta_{(Y)}$) at 230° C. and a shear rate of 60 s$^{-1}$, and the resin composition has a ratio [$\eta_{(X)}/\eta_{(Y)}$] of the viscosity ($\eta_{(X)}$) to the viscosity ($\eta_{(Y)}$) of 0.6 to 8.0.

[8] A film for a liquid-packaging container, the film containing the resin composition according to any one of [5] to [7].

[9] A liquid-packaging container containing the film for a liquid-packaging container according to [8].

[10] The liquid-packaging container according to [9], wherein the film for a liquid-packaging container has a structure of at least two layers including an inner layer and an outer layer,
the inner layer containing the resin composition (Z),
the outer layer containing a resin composition (P) that contains 60% by mass or more of a polypropylene-based resin (Y') having a propylene-derived structural unit content of 60% by mole or more.

[11] The liquid-packaging container according to [9], wherein the film for a liquid-packaging container has a structure of three or more layers including at least one intermediate layer between an inner layer and an outer layer,
either or both of the inner layer and the intermediate layer containing the resin composition (Z),
the outer layer containing a resin composition (P) that contains 60% by mass or more of a polypropylene-based resin (Y') having a propylene-derived structural unit content of 60% by mole or more.

[12] The liquid-packaging container according to [11], wherein the inner layer has a thickness in the range of 5 to 30 μm, the intermediate layer has a thickness in the range of 90 to 300 μm, and the outer layer has a thickness in the range of 15 to 120 μm.

[13] The liquid-packaging container according to [11] or [12], wherein the inner layer contains a resin component having a melting point MP$_{in}$ and the intermediate layer contains a resin component having a melting point MP$_{mid}$, the melting point MP$_{in}$ and the melting point MP$_{mid}$ satisfying the following formula:

$$MP_{in} < MP_{mid}.$$

[14] The liquid-packaging container according to any one of [10] to [13], wherein the inner layer contains the resin composition (Z) having a melting point MP$_Z$ and the outer layer contains the resin composition (P) having a melting point MP$_p$, the melting point MP$_Z$ and the melting point MP$_p$ satisfying the following formula (2):

$$0 < MP_p - MP_Z \leq 50 \qquad \text{formula (2).}$$

[15] A medical tool including the liquid-packaging container according to any one of [9] to [14].

Advantageous Effects of Invention

According to the present invention, a hydrogenated block copolymer that is suitable for a film for a liquid-packaging container, the film having high bag-breaking strength which is important in a medical liquid-packaging container, can be provided. The present invention can also provide a resin composition containing the hydrogenated block copolymer, and a film for a liquid-packaging container, a liquid-packaging container, and a medical tool that are produced by using the resin composition.

DESCRIPTION OF EMBODIMENTS

As used herein, any definition that is considered preferable can be selected and a combination of definitions that are considered preferable is more preferred.

[Hydrogenated Block Copolymer]

The hydrogenated block copolymer of the present invention is a hydrogenated block copolymer containing polymer blocks (A1) and (A2) each mainly containing an aromatic vinyl compound-derived structural unit and polymer blocks (B) and (C) each mainly containing a conjugated diene compound-derived structural unit, at least one of the polymer blocks (B) and (C) being present between the polymer blocks (A1) and (A2), the hydrogenated block copolymer having a total content of the polymer blocks (A1) and (A2) of 5 to 30% by mass, a 3,4-bond and 1,2-bond content in the polymer block (B) of 1 to 40% by mole, a 3,4-bond and 1,2-bond content in the polymer block (C) of 50 to 100% by mole, and a mass ratio [(C)/{(B)+(C)}] of the polymer block (C) to the sum of the polymer blocks (B) and (C) of 26/100 to 63/100.

Since the hydrogenated block copolymer of the present invention is a hydrogenated block copolymer in which at least one of the polymer blocks (B) and (C) is present between the polymer blocks (A1) and (A2) as described above, the hydrogenated block copolymer forms a phase of a fine dispersion diameter in a resin composition containing the hydrogenated block copolymer and a polyolefin-based resin in mixture. When a resin composition has a phase of a fine dispersion diameter, cohesive fracture occurs more easily than interfacial peeling and film fracture in a film produced by using the resin composition, resulting in enhanced bag-breaking strength.

When a sheet of the hydrogenated block copolymer of the present invention and a sheet of a polyolefin-based resin are heat-fused, the resulting tensile shear adhesion strength of the heat-fused portion may be an index of the bag-breaking strength. The tensile shear adhesion strength may be determined as follows, for example. According to JIS K 6850 (1999), a sheet of a hydrogenated block copolymer having a width of 25 mm, a length of 10 mm, and a thickness of 0.3 mm is interposed between two sheets of a polypropylene-based resin having a width of 25 mm, a length of 40 mm, and a thickness of 3 mm, and the sheets are heat-fused under a non-pressurized condition at 140° C. for 5 minutes to produce a sample, and the sample is pulled in parallel to the bonding surface (heat-fused surface) at a tensile speed of 500 mm/minute to measure the maximum load, which is then divided by the bonding area (heat-fused area), and the resulting value is taken as a tensile shear adhesion strength (MPa). The tensile shear adhesion strength (MPa) is preferably 4.5 MPa or less, more preferably 1.5 to 4.5 MPa, and further preferably 2 to 4 MPa. In this case, a film of a resin composition containing the hydrogenated block copolymer and the polyolefin-based resin has a higher bag-breaking strength.

The polyolefin-based resin used for the above index may be, for example, a propylene-butene random copolymer having an MFR of 5.8 g/10 minutes (230° C., 21.6 N), a melting point of 130° C., and a propylene content of 90% by mole.

The polymer blocks in the hydrogenated block copolymer of the present invention will be described in detail below.

<Polymer Blocks (A1) and (A2) Mainly Containing Aromatic Vinyl Compound-Derived Structural Unit>

The hydrogenated block copolymer of the present invention has polymer blocks (A1) and (A2) each mainly containing an aromatic vinyl compound-derived structural unit.

The polymer blocks (A1) and (A2) each mainly contain an aromatic vinyl compound-derived structural unit. The "mainly contain" herein means that the polymer blocks (A1) and (A2) each contain an aromatic vinyl compound-derived structural unit in an amount more than 50% by mass. The content of an aromatic vinyl compound-derived structural unit in the polymer block (A) is more preferably 70% by mass or more, further preferably 90% by mass or more in each of the polymer blocks (A1) and (A2) from the viewpoint of enhancing the transparency and mechanical properties of the resin composition containing the hydrogenated block copolymer of the present invention.

Examples of the aromatic vinyl compound include styrene, o-methylstyrene, m-methylstyrene, p-methylstyrene, α-methylstyrene, ß-methylstyrene, 2,6-dimethylstyrene, 2,4-dimethylstyrene, α-methyl-o-methylstyrene, α-methyl-m-methylstyrene, α-methyl-p-methylstyrene, 6-methyl-o-methylstyrene, 6-methyl-m-methylstyrene, 6-methyl-p-methylstyrene, 2,4,6-trimethylstyrene, α-methyl-2,6-dimethylstyrene, α-methyl-2,4-dimethylstyrene, 6-methyl-2,6-dimethylstyrene, 6-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, 6-chloro-o-chlorostyrene, 6-chloro-m-chlorostyrene, 6-chloro-p-chlorostyrene, 2,4,6-trichlorostyrene, α-chloro-2,6-dichlorostyrene, α-chloro-2,4-dichlorostyrene, 6-chloro-2,6-dichlorostyrene, 6-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, a styrene derivative substituted with a silyl group, indene, and vinylnaphthalene. Among them, from the viewpoint of a balance between the production cost and the physical properties, styrene, α-methylstyrene, and a mixture thereof are preferred, and styrene is more preferred.

Note that, as long as the purpose and effect of the present invention are not impaired, polymer blocks (A1) and (A2) may contain a structural unit derived from an unsaturated monomer other than an aromatic vinyl compound. Examples of the other unsaturated monomer include at least one selected from butadiene, isoprene, 2,3-dimethyl-1,3-butadiene, 1,3-pentadiene, 1,3-hexadiene, isobutylene, styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, 6-pinene, 8,9-p-mentene, dipentene, methylenenorbornene, and 2-methylenetetrahydrofuran. The bonding form in the case where the polymer blocks (A1) and (A2) contain a structural unit derived from the other unsaturated monomer is not particularly limited, and may be either of a random form or a tapered from.

When the polymer blocks (A1) and (A2) contain a structural unit derived from an unsaturated monomer other than an aromatic vinyl compound, the content thereof in each of the polymer blocks (A1) and (A2) is preferably 10% by mass or less.

The weight average molecular weights of the polymer blocks (A1) and (A2) are each preferably 2,500 to 100,000, more preferably 2,500 to 50,000, further preferably 3,000 to 30,000, furthermore preferably 3,000 to 20,000, furthermore preferably 3,000 to 15,000, furthermore preferably 3,000 to 12,000, and furthermore preferably 3,000 to 10,000. Note that all the "weight average molecular weights" described in this description and the claims are a weight average molecular weight based on polystyrene standards determined by gel permeation chromatography (GPC) measurement, and is more specifically a value measured according to a method described in Examples.

<Polymer Block (B) Mainly Containing Conjugated Diene Compound-Derived Structural Unit>

The polymer block (B) is a polymer block that mainly contains a conjugated diene compound-derived structural unit and that has a 3,4-bond and 1,2-bond content of 1 to 40% by mole. The "mainly contains" as used herein means that the polymer block (B) contains a conjugated diene compound-derived structural unit in an amount more than 50% by mass. The content of a conjugated diene compound-derived structural unit in the polymer block (B) is more preferably 70% by mass or more, and further preferably 90% by mass or more in the polymer block (B).

Examples of the conjugated diene compound constituting the polymer block (B) include at least one selected from butadiene, isoprene, 2,3-dimethyl-1,3-butadiene, 1,3-pentadiene, and 1,3-hexadiene. Among them, butadiene, isoprene, and a mixture of butadiene and isoprene are preferred, and isoprene and a mixture of butadiene and isoprene are further preferred.

When the polymer block (B) is constituted of structural units derived from two or more conjugated diene compounds (for example, butadiene and isoprene), the bonding form thereof is not particularly limited, and can be a random form, a tapered form, a completely alternating form, a partial block form, a block form, or a combination of two or more thereof.

The weight average molecular weight of the polymer block (B) is preferably 10,000 to 300,000, more preferably 20,000 to 270,000, further preferably 35,000 to 240,000, furthermore preferably 60,000 to 240,000, particularly preferably 61,000 to 220,000, furthermore preferably 61,000 to 170,000, furthermore preferably 61,000 to 150,000, furthermore preferably 61,000 to 120,000, and furthermore preferably 61,000 to 100,000 from the viewpoint of enhancing the softness of a resin composition containing the hydrogenated block copolymer of the present invention.

The polymer block (B) has a 3,4-bond and 1,2-bond content (hereinafter sometimes referred to as "vinyl bond content") of 1 to 40% by mole. When the 3,4-bond and 1,2-bond content is in the above range, the tensile shear adhesion strength between the hydrogenated block copolymer and the polypropylene-based resin can be kept low. From this point of view, the 3,4-bond and 1,2-bond content is preferably 1 to 20% by mole, and more preferably 2 to 10% by mole.

Note that the "3,4-bond and 1,2-bond content (vinyl bond content)" in the present invention means a proportion of the number of moles of structural units derived from a conjugated diene compound incorporated in bonding forms of 3,4-bond and 1,2-bond to the total number of moles of structural units derived from the conjugated diene compound incorporated in bonding forms of 3,4-bond, 1,2-bond, and 1,4-bond, in a polymer block in a block copolymer before hydrogenation, and can be calculated by a method described in Examples as described later.

Furthermore, the polymer block (B) may contain a structural unit derived from a polymerizable monomer other than a conjugated diene compound as long as it does not impair the purpose and effect of the present invention. Preferred examples of the other polymerizable monomer include at least one compound selected from aromatic vinyl compounds, such as styrene, α-methylstyrene, o-methylstyrene, m-methylstyrene, p-methylstyrene, p-t-butylstyrene, 2,4-dimethylstyrene, vinylnaphthalene, and vinylanthracene, and methyl methacrylate, methyl vinyl ether, N-vinylcarbazole, ß-pinene, 8,9-p-mentene, dipentene, methylenenorbornene, and 2-methylenetetrahydrofuran. When the polymer block (B) contains a structural unit derived from a polymerizable monomer other than a conjugated diene compound, the bonding form is not particularly limited, and may be either of a random form or a tapered from.

When the polymer block (B) contains a structural unit derived from a polymerizable monomer other than a conjugated diene compound, the content thereof is preferably 30% by mass or less in the polymer block (B), and more preferably 10% by mass or less.

<Polymer Block (C) Mainly Containing Conjugated Diene Compound-Derived Structural Unit>

The polymer block (C) is a polymer block that mainly contains a conjugated diene compound-derived structural unit, and that has a 3,4-bond and 1,2-bond content of 50 to 100% by mole. The "mainly contains" as used herein means the polymer block (C) contains a conjugated diene compound-derived structural unit in an amount more than 50% by mass. The content of the conjugated diene compound-derived structural unit in the polymer block (C) is more preferably 70% by mass or more, and further preferably 90% by mass or more in the polymer block (C).

Examples of the conjugated diene compound constituting the polymer block (C) include at least one selected from butadiene, isoprene, 2,3-dimethyl-1,3-butadiene, 1,3-pentadiene, and 1,3-hexadiene. Among them, butadiene, isoprene, and a mixture of butadiene and isoprene are preferred.

When the polymer block (C) is constituted of structural units derived from two or more conjugated diene compounds (for example, butadiene and isoprene), the bonding form is not particularly limited, and can be a random form, a tapered form, a completely alternating form, a partial block form, a block form, or a combination of two or more thereof.

The weight average molecular weight of the polymer block (C) is preferably 5,000 to 240,000, more preferably 10,000 to 220,000, further preferably 20,000 to 200,000, furthermore preferably 27,000 to 180,000, particularly preferably 28,000 to 140,000, furthermore preferably 28,000 to 90,000, and furthermore preferably 28,000 to 70,000 from the viewpoint of enhancing the softness of a resin composition containing the hydrogenated block copolymer of the present invention.

The polymer block (C) has a 3,4-bond and 1,2-bond content of 50 to 100% by mole. When the 3,4-bond and 1,2-bond content is in the above range, the compatibility between the polymer block (C) of the present invention and a polypropylene-based resin is increased. Thus, the dispersion diameter of the hydrogenated block copolymer in a resin composition is decreased, and interfacial peeling is less liable to occur in a film containing the resin composition, resulting in enhanced bag-breaking strength of a liquid-packaging container. From this point of view, the 3,4-bond and 1,2-bond content is preferably 54 to 90% by mole, and more preferably 57 to 80% by mole Furthermore, the polymer block (C) may contain a structural unit derived from a polymerizable monomer other than a conjugated diene compound as long as it does not impair the purpose and effect of the present invention. Preferred examples of the other polymerizable monomer include at least one compound selected from aromatic vinyl compounds, such as styrene, α-methylstyrene, o-methylstyrene, m-methylstyrene, p-methylstyrene, p-t-butylstyrene, 2,4-dimethylstyrene, vinylnaphthalene, and vinylanthracene, and methyl methacrylate, methyl vinyl ether, N-vinylcarbazole, 6-pinene, 8,9-p-mentene, dipentene, methylenenorbornene, and 2-methylenetetrahydrofuran. When the polymer block (C) contains a structural unit derived from a polymerizable monomer other than a conjugated diene compound, the bonding form is not particularly limited, and may be either of a random form or a tapered from.

When the polymer block (C) contains a structural unit derived from a polymerizable monomer other than a conjugated diene compound, the content thereof in the polymer block (C) is preferably 30% by mass or less, and more preferably 10% by mass or less.

<Mass Ratio of Polymer Blocks (B) and (C)>

The hydrogenated block copolymer of the present invention has a mass ratio [(C)/{(B)+(C)}] of the polymer block (C) to the sum of the polymer blocks (B) and (C) of 26/100 to 63/100. When the mass ratio is in the above range, the aforementioned tensile shear adhesion strength between the hydrogenated block copolymer and a polypropylene-based resin is 4.5 MPa or less, and the dispersion diameter of the hydrogenated block copolymer in a resin composition containing the hydrogenated block copolymer and a polypropylene-based resin is decreased to a fine size, interfacial peeling and film fracture are less liable to occur in a film having a layer of the resin composition, resulting in enhanced bag-breaking strength of a liquid-packaging container. With a mass ratio of the polymer block (C) less than the lower limit, the dispersion diameter of the hydrogenated block copolymer is not decreased to a fine size, and with a mass ratio larger than the upper limit, there is a problem in that the tensile shear adhesion strength with a polypropylene-based resin is excessively increased. From these points of view, the mass ratio [(C)/{(B)+(C)}] is preferably 26/100 to 60/100, more preferably 26/100 to 56/100, further preferably 27/100 to 52/100, furthermore preferably 27/100 to 45/100, furthermore preferably 27/100 to 40/100, and furthermore preferably 27/100 to 35/100. Particularly from the viewpoint of enhancing the bag-breaking strength of a liquid-packaging container, the mass ratio [(C)/{(B)+(C)}] is preferably 26/100 to 60/100, more preferably 26/100 to 56/100, further preferably 27/100 to 52/100, furthermore preferably 27/100 to 45/100, furthermore preferably 27/100 to 40/100, and furthermore preferably 27/100 to 35/100. With a mass ratio [(C)/{(B)±(C)}] in the above range, the shock resistance of the resin composition (Z) as described later is enhanced and the bag-breaking strength is enhanced.

<Hydrogenation Rate of Polymer Blocks (B) and (C)>

In the hydrogenated block copolymer of the present invention, the hydrogenation rate of the polymer blocks (B) and (C) (hereinafter sometimes abbreviated as hydrogenation rate) is preferably 80% by mole or more, more preferably 85% by mole or more, further preferably 90% by mole or more, and furthermore preferably 93% by mole or more from the viewpoint of enhancing the heat resistance and weather resistance. The upper limit of the hydrogenation rate is not particularly limited, and the upper limit may be 99% by mole or may be 98% by mole.

Note that the hydrogenation rate is a value determined by calculating the content of carbon-carbon double bonds in the structural units derived from conjugated diene compounds in the polymer blocks (B) and (C) before and after hydrogenation using a $^1$H-NMR spectrum, and more specifically is measured according to a method described in Examples. As used herein, the "hydrogenation rate of the polymer blocks (B) and (C)" refers to the average of the respective hydrogenation rates of the polymer blocks (B) and (C).

<Amount of Each Polymer Block in Hydrogenated Block Copolymer>

The total content of the polymer blocks (A1) and (A2) in the hydrogenated block copolymer of the present invention is 5 to 30% by mass. When the total content of the polymer blocks (A1) and (A2) is less than the lower limit, the rubber elasticity and viscosity of the hydrogenated block copolymer of the present invention are decreased. On the other hand, when the total content is more than the upper limit, the softness of a layer formed from a resin composition containing the hydrogenated block copolymer of the present invention and a polypropylene-based resin is decreased. From these points of view, the total content of the polymer blocks (A1) and (A2) is preferably 7 to 30% by mass, more preferably 10 to 28% by mass, and further preferably 15 to 25% by mass. Note that the total content of the polymer blocks (A1) and (A2) is a value determined by a $^1$H-NMR spectrum and is more specifically a value measured according to a method described in Examples.

The content of the polymer block (B) in the hydrogenated block copolymer of the present invention is preferably 20 to 65% by mass, more preferably 25 to 60% by mass, and further preferably 30 to 58% by mass. When the content of the polymer block (B) is in the above range, the tensile shear adhesion strength with a polypropylene-based resin can be kept low.

The content of the polymer block (C) in the hydrogenated block copolymer of the present invention is preferably 10 to 50% by mass, more preferably 20 to 45% by mass, and further preferably 24 to 42% by mass. When the content of the polymer block (C) is in the above range, the compatibility between a polypropylene-based resin and the hydrogenated block copolymer is enhanced.

<Bonding Form of Polymer Block>

In the hydrogenated block copolymer of the present invention, at least one of the polymer blocks (B) and (C) is present between the polymer blocks (A1) and (A2). Accordingly, in the hydrogenated block copolymer of the present invention, the dispersibility of the hydrogenated block copolymer can be enhanced while maintaining the viscosity and cohesion that enable pelletization. When the dispersibility is enhanced, the bag-breaking strength of a liquid-packaging container formed from a resin composition containing the hydrogenated block copolymer is enhanced.

In the hydrogenated block copolymer of the present invention, as long as at least one of the polymer blocks (B) and (C) is present between the polymer blocks (A1) and (A2), the bonding form is not limited and may be any of a linear form, a branched form, a radial form, or a combination of two or more thereof.

The bonding form of the polymer blocks (A1), (A2), polymer blocks (B), and (C) is preferably a linear form, and when the polymer block (A1) is represented by A1, the polymer block (A2) by A2, the polymer block (B) by B, and the polymer block (C) by C, examples of the bonding form include a tetrablock copolymer represented by A1-B-A2-C, a tetrablock copolymer represented by A1-C-A2-B, and a tetrablock copolymer represented by A1-B-C-A2. Among them, a tetrablock copolymer of A1-B-A2-C in this order is preferred from the viewpoint of reducing the size of the dispersed phase to a fine value while keeping low the tensile shear adhesion strength between the hydrogenated block copolymer and a polypropylene-based resin.

Here, in this description, when polymer blocks of the same type are bonded via a bifunctional coupling agent or the like in a linear form, the whole of the bonded polymer blocks is treated as one polymer block. Accordingly, including the above example, a polymer block that is originally to be strictly represented by Y—X—Y (X represents a coupling agent residue) is expressed as a whole by Y except for a case where the polymer block is required to be particularly distinguished from a single polymer block Y. In this description, since this type of a polymer block containing a coupling agent residue is treated in this manner, for example, a block copolymer that contains a coupling agent residue and is strictly to be expressed by A1-B-X-B-A2-C(X represents a coupling agent residue) is represented by A1-B-A2-C and is treated as an example of a tetrablock copolymer.

In addition, in the hydrogenated block copolymer, a polymer block (D) derived from a polymerizable monomer other than the polymer block (A1), the polymer block (A2), the polymer block (B), and the polymer block (C) may be present to the extent that the purpose of the present invention is not impaired, but from the viewpoint of enhancing the bag-breaking strength of a liquid-packaging container produced by using the hydrogenated block copolymer of the present invention, a tetrablock copolymer constituted of four blocks of the polymer blocks (A1) and (A2) and the polymer blocks (B) and (C) is preferred.

In the hydrogenated block copolymer, an antiblocking agent can be incorporated as required, preferably into pellets thereof, for the purpose of preventing pellet blocking. Examples of the antiblocking agent include, but not limited to, calcium stearate, magnesium stearate, zinc stearate, polyethylene, polypropylene, ethylene bisstearyl amide, talc, and amorphous silica.

<Characteristics of Hydrogenated Block Copolymer>

The weight average molecular weight of the hydrogenated block copolymer of the present invention is preferably 60,000 to 500,000, more preferably 70,000 to 400,000, further preferably 80,000 to 300,000, furthermore preferably 90,000 to 200,000, and furthermore preferably 95,000 to 160,000. When the weight average molecular weight is in the above range, the mechanical strength is enhanced and the mold-processability is also enhanced.

The molecular weight distribution (Mw/Mn) of the hydrogenated block copolymer of the present invention is not particularly limited, but from the viewpoint of the mechanical strength of a resulting resin composition, the molecular weight distribution (Mw/Mn) is preferably 1.0 to 1.4, more preferably 1.0 to 1.2, further preferably 1.00 to 1.10, and most preferably 1.00 to 1.05. Note that the molecular weight distribution (Mw/Mn) is a value measured according to a method described in Examples.

Regarding the flowability of the hydrogenated block copolymer, from the viewpoint of enhancing the mold-processability of the resin composition, the melt flow rate measured at 230° C. and 21.6 N is preferably 0.1 to 80 g/10 minutes, more preferably 1 to 50 g/10 minutes, and further preferably 1.5 to 20 g/10 minutes.

From the viewpoint of enhancing the softness, transparency, and bag-breaking strength, the glass transition point (Tg) based on the polymer block (B) and the polymer block (C) of the hydrogenated block copolymer of the present invention is preferably −56° C. or higher, more preferably −53° C. or higher, further preferably −50° C. or higher, and preferably −30° C. or lower, more preferably −35° C. or lower, and further preferably −40° C. or lower.

<Method of Producing Hydrogenated Block Copolymer>

The hydrogenated block copolymer can be produced by a solution polymerization method, an emulsion polymerization method, a solid state polymerization method, or the like. Among them, a solution polymerization method is preferred, and a known method, for example, an ion polymerization method, such as anionic polymerization or cationic polymerization, or a radical polymerization method, can be applied. Among them, an anionic polymerization method is preferred. In an anionic polymerization method, in the presence of a solvent, an anionic polymerization initiator, and as required, a Lewis base, an aromatic vinyl compound and a conjugated diene compound are sequentially added to obtain a block copolymer, and then the block copolymer is hydrogenated, whereby a hydrogenated block copolymer can be obtained.

Examples of organolithium compounds used as a polymerization initiator in the above method include monolithium compounds, such as methyllithium, ethyllithium, pentyllithium, n-butyllithium, sec-butyllithium, and tert-butyllithium, and a dilithium compound, such as tetraethylenedilithium.

The solvent is not particularly limited as long as it does not have negative influence on an anionic polymerization reaction, and examples thereof include aliphatic hydrocarbons, such as cyclohexane, methylcyclohexane, n-hexane, and n-pentane; aromatic hydrocarbons, such as benzene, toluene, and xylene. The polymerization reaction is typically performed at 0 to 100° C. for 0.5 to 50 hours.

Lewis base has a function of controlling a micro structure in a conjugated diene compound-derived structural unit. Examples of the Lewis base include dimethyl ether, diethyl ether, tetrahydrofuran, dioxane, ethylene glycol dimethyl ether, pyridine, N,N,N',N'-tetramethylethylenediamine, trimethylamine, and N-methylmorpholine. One Lewis base may be used alone or two or more Lewis bases may be used in combination.

After polymerization by the above method, an active hydrogen compound, such as an alcohol, a carboxylic acid, or water, is added to terminate the polymerization reaction, and the resultant is hydrogenated in an inactive organic solvent in the presence of a hydrogenation catalyst according to a known method, whereby a hydrogenated product can be produced.

The hydrogenation reaction can be performed in the presence of a hydrogenation catalyst under conditions of a reaction temperature of 20 to 100° C. and a hydrogen pressure of 0.1 to 10 MPa.

Examples of the hydrogenation catalyst include: Raney nickel; an ununiform catalyst in which a metal, such as platinum (Pt), palladium (Pd), ruthenium (Ru), rhodium (Rh), or nickel (Ni), is supported on a carrier, such as carbon, alumina, or diatom earth; a Ziegler catalyst containing a combination of an organometallic compound of a group 8 metal, such as nickel or cobalt, and an organoaluminum compound, such as triethylaluminum or triisobutylaluminum, an organolithium compound, or the like; and a metallocene catalyst containing a combination of a bis(cyclopentadienyl) compound of a transition metal, such as titanium, zirconium, or hafnium, and an organometallic compound of lithium, sodium, potassium, aluminum, zinc, magnesium, or the like.

The thus-produced hydrogenated block copolymer can be obtained by pouring a polymerization reaction liquid into methanol or the like to solidify the liquid, then drying the solid with heat or under a reduced pressure, or pouring a polymerization reaction liquid in boiled water and removing the solvent by azeotropic distillation, in other word, performing so-called steam tripping, and then drying the resultant with heat or under a reduced pressure.

[Resin Composition]

The resin composition of the present invention is a resin composition (Z) that contains a hydrogenated block copolymer (X) that is the hydrogenated block copolymer of the present invention and a polypropylene-based resin (Y), the hydrogenated block copolymer (X) and the polypropylene-based resin (Y) satisfying the following condition.

<Condition>

When 30 parts by mass of the hydrogenated block copolymer (X) and 70 parts by mass of the polypropylene-based resin (Y) are kneaded under conditions of 230° C. and a shear rate of 30 to 150 s$^{-1}$, a sea-island structure in which the hydrogenated block copolymer (X) is a dispersed phase is formed and the size of the dispersed phase is 0.1 μm or more and 1.0 μm or less.

In the resin composition of the present invention, as the size of the dispersed phase is smaller, the interface area between the dispersed phase and a continuous phase is larger and an energy absorption effect by cohesive fracture is higher, leading to higher bag-breaking strength. From this point of view, the size of the dispersed phase is 1.0 μm or less, preferably 0.5 μm or less, and more preferably 0.4 μm or less. On the other hand, when the size of the dispersed phase is too small, an effect of exerting shock resistance as rubber particles is reduced. Accordingly, the size of the dispersed phase is 0.1 μm or more, and preferably 0.15 μm or more, and more preferably 0.2 μm or more. Note that all the "sizes of the dispersed phase" described in this description and the claims are a value measured according to a method described in Examples.

Alternatively, the resin composition of the present invention is a resin composition (Z) that contains a hydrogenated block copolymer (X) that is the hydrogenated block copolymer of the present invention and a polypropylene-based resin (Y), the mass ratio [(Y)/{(X)+(Y)}] of the polypropylene-based resin (Y) to the sum of the hydrogenated block copolymer (X) and the polypropylene-based resin (Y) being 61/100 to 95/100.

Components used in the resin composition (Z) will be described below. A suitable aspect of the hydrogenated block copolymer (X) used in the resin composition of the present invention is as described above.

<Polypropylene-Based Resin (Y)>

The polypropylene-based resin (Y) used in resin composition (Z) is not particularly limited as long as the propylene-derived structural unit content (hereinafter sometimes abbreviated as "propylene content") is 60% by mole or more, and a known polypropylene-based resin can be used. The propylene-derived structural unit content is preferably 80% by mole or more, more preferably 85 to 100% by mole, and further preferably 90 to 100% by mole.

Examples of the structural unit derived from a monomer other than propylene include a structural unit derived from ethylene, a structural unit derived from α-olefin, such as 1-butene, 1-hexene, 1-heptene, 1-octene, 4-methyl-1-pentene, 1-nonene, or 1-decene, and a structural unit derived from a modifier as described later.

Examples of the polypropylene-based resin (Y) include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and a modified product thereof. Examples of the modified product include a compound obtained by graft-copolymerization of a polypropylene-based resin with a modifier and a compound obtained by copolymerization of the main chain of a polypropylene-based resin with a modifier. Examples of the modifier include: unsaturated dicarboxylic acids, such as maleic acid, citraconic acid, a halogenated maleic acid, itaconic acid, cis-4-cyclohexene-1,2-dicarboxylic acid, and endo-cis-bicyclo[2.2.1]-5-heptene-2,3-dicarboxylic acid; an ester, amide, or imide of an unsaturated dicarboxylic acid; unsaturated dicarboxylic acid anhydrides, such as maleic anhydride, citraconic anhydride, a halogenated maleic anhydride, itaconic anhydride, cis-4-cyclohexene-1,2-dicarboxylic acid anhydride, and endo-cis-bicyclo[2.2.1]-5-heptene-2,3-dicarboxylic acid anhydride; unsaturated monocarboxylic acids, such as acrylic acid, methacrylic acid, and crotonic acid; and an ester (methyl acrylate, ethyl acrylate, methyl methacrylate, ethyl methacrylate, etc.), amide, or imide of an unsaturated monocarboxylic acid. The polypropylene-based resin (Y) is preferably an unmodified one.

Among them, from the viewpoint of being easily available at a relatively low cost, homopolypropylene, a propylene-ethylene random copolymer, a propylene-ethylene block copolymer, a propylene-butene random copolymer, and a propylene-butene block copolymer are preferred, and a propylene-ethylene random copolymer, a propylene-butene random copolymer, and a propylene-butene block copolymer are more preferred, and a propylene-butene random copolymer is further preferred.

As the polypropylene-based resin (Y), one resin may be used alone or two or more resins may be used in combination.

From the viewpoint of the mold-processability of the resin composition (Z), the melt flow rate (MFR) of the polypropylene-based resin (Y) as measured under conditions of 230° C. and 21.6 N is preferably 0.1 to 30 g/10 minutes, more preferably 1 to 20 g/10 minutes, and further preferably 1 to 10 g/10 minutes. Note that all the "melt flow rates" described in this description and the claims are a value measured according to JIS K 7210.

The melting point of the polypropylene-based resin (Y) is preferably 120 to 160° C. When the melting point of the polypropylene-based resin (Y) is 120° C. or higher, agglutination of an inner layer tends to be suppressed. When the melting point of the polypropylene-based resin (Y) is 160° C. or lower, the heat-sealing property is good. Note that all the "melting points" described in this description and the claims are measured by a method described in Examples.

<Ratio of Viscosities of Hydrogenated Block Copolymer (X) and Polypropylene-Based Resin (Y)>

The ratio $[\eta_{(X)}/\eta_{(Y)}]$ of the viscosity $(\eta_{(X)})$ of the hydrogenated block copolymer (X) to the viscosity $(\eta_{(Y)})$ of the polypropylene-based resin (Y) at 230° C. and a shear rate of 60 s$^{-1}$ is preferably 0.6 to 8.0. When the ratio of viscosities is in the above range, the dispersion diameter of the hydrogenated block copolymer in a resin composition containing the hydrogenated block copolymer and a polypropylene-based resin is reduced to a fine size, resulting in enhanced bag-breaking strength of a liquid-packaging container produced by using the resin composition of the present invention. From this point of view, the ratio $[\eta_{(X)}/\eta_{(Y)}]$ is preferably 0.6 to 7.0, more preferably 0.7 to 6.0, and further preferably 0.8 to 5.0. In this description, a viscosity at 230° C. and a shear rate of 60 s$^{-1}$ can be measured by a method described in Examples.

From the viewpoints of the productivity and moldability, the viscosity $(\eta_{(X)})$ of the hydrogenated block copolymer (X) is preferably 100 to 10,000 Pa·s, more preferably 300 to 5,000 Pa·s, and further preferably 500 to 3,000 Pa·s.

<Mass Ratio and Contents of Components>

In the resin composition (Z) used in the present invention, the mass ratio $[(Y)/\{(X)+(Y)\}]$ of the polypropylene-based resin (Y) to the sum of the hydrogenated block copolymer (X) and the polypropylene-based resin (Y) is 61/100 to 95/100. When the mass ratio is less than the lower limit, the mold-processability is deteriorated. On the other hand, when the mass ratio is more than the upper limit, the softness and transparency are reduced. From these points of view, the mass ratio $[(Y)/\{(X)+(Y)\}]$ is preferably 63/100 to 90/100, more preferably 65/100 to 85/100, and further preferably 67/100 to 80/100.

The content of the polypropylene-based resin (Y) in the resin composition (Z) is preferably 50 to 90% by mass, more preferably 55 to 85% by mass, and further preferably 60 to 80% by mass. When the content of the polypropylene-based resin (Y) is in the above range, the softness, transparency, and mold-processability are enhanced.

The content of the hydrogenated block copolymer (X) in the resin composition (Z) is preferably 10 to 50% by mass, more preferably 15 to 45% by mass, and further preferably 20 to 40% by mass. When the content of the hydrogenated block copolymer (X) is in the above range, the softness, transparency, and mold-processability are enhanced.

<Other Components>

The resin composition (Z) may contain, in addition to the hydrogenated block copolymer (X) and the polypropylene-based resin (Y), an additive, such as an antioxidant, an ultraviolet absorber, an photostabilizer, a colorant, or a crystal nucleating agent; a hydrogenated resin, such as a hydrogenated coumarone-indene resin, a hydrogenated rosin resin, a hydrogenated terpene resin, or a hydrogenated alicyclic petroleum resin; a tackifying resin, such as an aliphatic resin containing an olefin and diolefin polymer; or another polymer, such as hydrogenated polyisoprene, hydrogenated polybutadiene, a hydrogenated styrene-butadiene random copolymer, a hydrogenated styrene-isoprene random copolymer, a hydrogenated polystyrene-poly(isoprene/butadiene)-polystyrene block copolymer, a hydrogenated polystyrene-polyisoprene-polystyrene block copolymer, a hydrogenated polystyrene-polybutadiene-polystyrene block copolymer, an α-olefin copolymer, a butyl rubber, polyisobutylene, or polybutene, to the extent that the effect of the present invention is not impaired.

Note that the total content of the hydrogenated block copolymer (X) and the polypropylene-based resin (Y) in the resin composition (Z) is preferably 50% by mass or more, more preferably 70% by mass or more, more preferably 80% by mass or more, more preferably 90% by mass or more, and further preferably 95% by mass or more, from the viewpoint of the effect of the present invention.

<Method of Producing Resin Composition>

A method of producing the resin composition of the present invention is not particularly limited, and, for example, the resin composition can be produced by kneading components using a kneading machine, such as a single screw extruder, a twin screw extruder, a kneader, a Bunbury mixer, or a roll.

[Film for a Liquid-Packaging Container and Liquid-Packaging Container]

The film for a liquid-packaging container of the present invention contains the resin composition of the present invention, and the liquid-packaging container of the present invention is produced by using the film for a liquid-packaging container of the present invention.

<Liquid-Packaging Container (I)>

A first aspect of the liquid-packaging container of the present invention is a liquid-packaging container formed of a film for a liquid-packaging container, the film having a structure of at least two or more layers including an inner layer and an outer layer, the inner layer containing the resin composition (Z), the outer layer containing a resin composition (P) that contains 60% by mass or more of a polypropylene-based resin (Y') having a propylene-derived structural unit content of 60% by mole or more. Materials constituting the layers will be described below.

[Inner Layer of Liquid-Packaging Container (I)]

A material of an inner layer which is a layer in contact with liquid will be described first. The inner layer of the liquid-packaging container used in this embodiment contains the resin composition (Z). A suitable aspect of the resin composition (Z) is as described above.

[Outer Layer of Liquid-Packaging Container (I)]

The outer layer is a layer that is provided outside the inner layer and that is in contact with the outside air. The outer layer contains the resin composition (P).

(Resin Composition (P))

The resin composition (P) used in the present invention contains 60% by mass or more of a polypropylene-based resin (Y') having a propylene-derived structural unit content of 60% by mole or more.

The polypropylene-based resin (Y') is explained in the same manner as in the explanation of the polypropylene-based resin (Y) in the resin composition (Z).

In particular, the propylene-derived structural unit content in the polypropylene-based resin (Y') is preferably 80% by mole or more, more preferably 80 to 100% by mole, further preferably 80 to 99% by mole, and particularly preferably 85 to 98% by mole.

The melting point of the polypropylene-based resin (Y') is preferably 120 to 180° C., more preferably 125 to 175° C., and further preferably 130 to 170° C. When the melting point of the polypropylene-based resin (Y') is lower than the lower limit, the heat-sealing property of the film is deteriorated.

The polypropylene-based resin (Y') is preferably at least one selected from a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer.

The resin composition (P) may contain, in addition to the polypropylene-based resin (Y'), an additive, such as an antioxidant, an ultraviolet absorber, an photostabilizer, a colorant, or a crystal nucleating agent; a hydrogenated resin, such as a hydrogenated coumarone-indene resin, a hydrogenated rosin resin, a hydrogenated terpene resin, or a hydrogenated alicyclic petroleum resin; a tackifying resin, such as an aliphatic resin containing an olefin and diolefin polymer; or another polymer, such as hydrogenated polyisoprene, hydrogenated polybutadiene, a hydrogenated styrene-butadiene random copolymer, a hydrogenated styrene-isoprene random copolymer, a hydrogenated polystyrene-poly(isoprene/butadiene)-polystyrene block copolymer, a hydrogenated polystyrene-polyisoprene-polystyrene block copolymer, a hydrogenated polystyrene-polybutadiene-polystyrene block copolymer, a butyl rubber, polyisobutylene, or polybutene, to the extent that the effect of the present invention is not impaired.

Note that the content of the polypropylene-based resin (Y') in the resin composition (P) is 60% by mass or more, preferably 62% by mass or more, and more preferably 64% by mass or more, from the viewpoint of the effect of the present invention.

[Thickness of Inner Layer and Outer Layer in Liquid-Packaging Container (I)]

The thicknesses of the inner layer and the outer layer are not particularly limited, and can be appropriately adjusted according to the application. The thickness of the inner layer is preferably 5 to 30 μm, and more preferably 10 to 30 μm. The thickness of the outer layer is preferably 100 to 300 μm, more preferably 100 to 200 μm, and further preferably 100 to 180 μm.

<Liquid-Packaging Container (II)>

A second aspect of the liquid-packaging container of the present invention is a liquid-packaging container formed of a film for a liquid-packaging container having a structure of three or more layers including at least one intermediate layer between an inner layer and an outer layer, either or both of the inner layer and the intermediate layer containing the resin composition (Z), the outer layer containing the resin composition (P) that contains 60% by mass or more of the polypropylene-based resin (Y') having a propylene-derived structural unit content of 60% by mole or more.

[Inner Layer and Intermediate Layer of Liquid-Packaging Container (II)]

The resin compositions constituting the inner layer and the intermediate layer of the liquid-packaging container (II) are not particularly limited, and either one preferably contains the resin composition (Z), and more preferably, the both contain the resin composition (Z). When both of the inner layer and the intermediate layer contain the resin composition (Z), resin compositions (Z) having different compositions are used in the inner layer and in the intermediate layer. A suitable aspect of the resin composition (Z) is as described above.

[Outer Layer of Liquid-Packaging Container (II)]

The outer layer of the liquid-packaging container (II) contains the resin composition (P), and a suitable aspect of the resin composition (P) is as described above.

In the liquid-packaging container (II), the melting point $MP_{in}$ of a resin component constituting the inner layer and the melting point $MP_{mid}$ of a resin component constituting the intermediate layer preferably satisfy the formula: $MP_{in} < MP_{mid}$. When the melting points $MP_{in}$ and $MP_{mid}$ satisfy the above formula, the heat-sealing property is enhanced.

The melting point $MP_{in}$ is preferably 120 to 180° C., and more preferably 125 to 180° C. From the viewpoint of enhancing the heat-sealing property, the difference between the melting points $MP_{in}$ and $MP_{mid}$ is preferably 10° C. or more, and more preferably 20° C. or more.

In the liquid-packaging containers (I) or (II) of the present invention, the melting point $MP_Z$ of the resin composition (Z) constituting the inner layer and the melting point $MP_p$ of the resin composition (P) constituting the outer layer preferably satisfy the following formula (2):

$$0 < MP_p - MP_Z \leq 50 \quad \text{formula (2)}.$$

When the above formula (2) is satisfied, the heat-sealing property is enhanced. From the viewpoint of enhancing the heat-sealing property, the lower limit of the formula (2) is preferably 5 or more, more preferably 10 or more, and the upper limit is preferably 40 or less, more preferably 30 or less.

[Thicknesses of Inner Layer, Intermediate Layer, and Outer Layer in Liquid-Packaging Container (II)]

The thicknesses of the inner layer, the intermediate layer, and the outer layer are not particularly limited, and can be appropriately adjusted according to the application. From the viewpoints of the heat-sealing strength and the bag-breaking strength, the thickness of the inner layer is preferably 5 to 30 µm, and more preferably 10 to 30 µm. From the viewpoints of the softness, transparency, and economy, the thickness of the intermediate layer is preferably 90 to 300 µm, more preferably 100 to 300 µm, further preferably 100 to 200 µm, and furthermore preferably 100 to 180 µm. From the viewpoint of the barrier property, the thickness of the outer layer is preferably 15 to 120 µm, more preferably 15 to 80 µm, and further preferably 15 to 70 µm.

Note that when the liquid-packaging container of the present invention (II) has a configuration of four or more layers, that is, a configuration including an inner layer, an outer layer, and a plurality of intermediate layers or including another layer or the like, the aforementioned thickness of the intermediate layer is the sum of thicknesses of intermediate layers, that is, the sum of thicknesses of layers between the inner layer and the outer layer.

Between layers, such as the inner layer, the intermediate layer, and the outer layer, or on the surface of the outer layer, another layer may be provided as long as the effect of the present invention is not impaired. Examples of said another layer include an adhesive layer, a protective layer, a coating layer, a light reflection layer, and a light absorption layer.

In the liquid-packaging container of the present invention, the inner layer and the intermediate layer are preferably in contact with each other and the intermediate layer and the outer layer are preferably in contact with each other.

<Method of Producing Liquid-Packaging Container>

The method of producing the liquid-packaging container of the present invention is not particularly limited, and a laminate body is formed using a known method of producing a laminate body, and then is subjected to heat sealing, and cut off (cut out) into a liquid-packaging container, and in the case of medical application, is further subjected to a sterilization treatment. Here, when the aforementioned resin compositions of the respective layers are used, the film moldability is good, and thus there is an advantage in that a film (laminate body) without fish eye, foreign matter, and the like is easily formed.

A preferred example of a method of producing a laminate body is the following method. First, materials of each layer are kneaded using a kneading machine, such as a single screw extruder, a twin screw extruder, a kneader, a Bunbury mixer, or a roll, to prepare a resin composition for each layer. The resulting resin compositions are molded into a film shape, a sheet shape, a tube shape, or the like by co-extrusion using a multilayer T-die or by air cooling or water cooling inflation molding using a multilayer circular T-die, for example. The resin temperature in molding is preferably 150 to 300° C., more preferably 180 to 250° C., and further preferably 180 to 220° C. The cooling temperature in air cooling or water cooling inflation molding is preferably 7 to 70° C., and more preferably 10 to 40° C. From the viewpoint of the ease of production of a liquid-packaging container, the resin composition is preferably molded into a tube shape. A molded product of a tube shape can provide a liquid-packaging container by cutting off (cutting out) after heat sealing. On the other hand, in the case of a molded product of a film shape or a sheet shape, it is required that two sheets are stacked and are then subjected to heat sealing.

In the case of a medical application, steam sterilization or autoclave sterilization is further performed as a sterilization treatment. In the case of autoclave sterilization, the heating temperature is preferably 100 to 150° C., and more preferably 110 to 140° C.

By providing a port from which liquid is injected, a cap including a rubber stopper for taking out the liquid, and the like, the liquid-packaging container is effectively used as a medical container, such as an infusion bag. Thus, the present invention also provides a medical container including the liquid-packaging container.

[Medical Tool and Application]

The liquid-packaging container of the present invention can be used in a medical tool or various other applications. The liquid-packaging container can be effectively used, not only in a medical tool, but also as a food packaging container for packaging a retort food, mayonnaise, ketchup, soft drink, ice cream, or the like, for example.

EXAMPLES

The present invention will be specifically described below with reference to examples and the like, but the present invention is in no way limited to the examples. Note that physical properties in Examples and Comparative Examples are measured or evaluated by the following methods.

[Measurement Method]

<Weight Average Molecular Weight (Mw) and Molecular Weight Distribution (Mw/Mn)>

They were determined as a molecular weight based on polystyrene standards by gel permeation chromatography (GPC).

Apparatus=GPC apparatus "HLC-8020" (manufactured by TOSOH CORPORATION)
  Separation column: "TSKgel GMHXL", "G4000HXL", and "G5000HXL" manufactured by TOSOH CORPORATION were connected in series.
  Eluent: tetrahydrofuran
  Flow rate of eluent: 1.0 mL/minute
  Column temperature: 40° C.
  Detection method: differential refractive index (RI)

<Contents of Polymer Blocks (A1), (A2), (B), and (C) in Hydrogenated Block Copolymer (X), and Hydrogenation Rates (% by Mole) of Polymer Blocks (B) and (C)>

They were determined by $^1$H-NMR measurement.
  Apparatus: nuclear magnetic resonance apparatus "Lambda-500" (manufactured by JOEL, ltd.)
  Solvent: deuterated chloroform <Vinyl Bond Content (Total Content of 1,2-Bond and 3,4-Bond) (% by Mole) in Polymer Blocks (B) and (C) Before Hydrogenation>

$^1$H-NMR measurement was performed on a block copolymer before hydrogenation, and the proportion of the peak area of 1,2-bond and 3,4-bond to the sum of the peak area of 1,2-bond and 3,4-bond and the peak area of 1,4-bond was calculated and taken as the vinyl bond content (% by mole).

<Viscosity (Pa·s)>

In a capillary rheometer "Instron SR20", an apparent viscosity (Pa·s) at 230° C. and at a shear rate of 60 s$^{-1}$ was measured for the hydrogenated block copolymers of Production Examples 1 to 6 and polypropylene-based resins using a capillary die of a diameter of 1 mm and a length of 10 mm.

In addition, the viscosity ratio [$\eta_{(X)}/\eta_{(Y)}$] was calculated as the ratio of the viscosity ($\eta_{(X)}$) of a hydrogenated block copolymer to the viscosity ($\eta_{(Y)}$) of a polypropylene-based resin which were obtained above.

<Melting Point (° C.)>

A sample was heated from 30° C. to 250° C. at a temperature increase rate of 10° C./minute to melt the sample using a differential scanning calorimeter "DSC6200" manufactured by Seiko Instruments Inc., and the sample was then cooled from 250° C. to 30° C. at a temperature decrease rate of 10° C./minute. Subsequently, the temperature was increased again from 30° C. to 250° C. at a temperature increase rate of 10° C./minute, and the peak top temperature in the main endothermic peak measured during the latter heating was taken as the melting point (° C.). Note that for a film having two or more layers, a sample was taken by slicing off each layer and was then measured in the same manner as above.

[Evaluation Method]

<Size of Dispersed Phase (μm)>

The size of a dispersed phase was measured according to the following (1) to (2).

(1) Melt-Kneading of Hydrogenated Block Copolymer (X) and Polypropylene-Based Resin (Y)

The hydrogenated block copolymer (X) and the polypropylene-based resin (Y) were melt-kneaded under conditions of 230° C. and a rotor rotation number of 100 rpm (corresponding to a shear rate of 60 s$^{-1}$) for 5 minutes to thereby produce a (Y)/(X) blend resin (mass ratio: 70/30).

(2) Observation by Scanning Electron Microscope

The morphology of a cross section of a (Y)/(X) blend was observed using a scanning electron microscope (SEM) "JSM-6510" (manufactured by JOEL ltd.). A sample was frozen using liquid nitrogen, was cut in the frozen state, and was immersed in cyclohexane of room temperature for 1 minute to elute the hydrogenated block copolymer (X) forming islands. Subsequently, platinum was deposited on the surface of the sample and then was observed under a vacuum condition.

Specifically, a scanning electron microscope photograph of the cross section of the (Y)/(X) blend resin was subjected to a binarization processing using an image processing software, Image-Pro PLUS 6.1 (manufactured by Media Cybernetics Inc.) to determine the number average diameter of particles of the hydrogenated block copolymer (X) and the obtained value was taken as the size of the dispersed phase (μm).

The smaller the size of the dispersed phase, the larger the interfacial area between the dispersed phase and the continuous phase and the higher the energy absorption effect by cohesive fracture, leading to higher bag-breaking strength. Specifically, the size of the dispersed phase is preferably 1.0 μm or less, more preferably 0.5 μm or less, and further preferably 0.4 μm or less. On the other hand, when the size of the dispersed phase is too small, the effect of exerting shock resistance as rubber particles is reduced. Accordingly, the size of the dispersed phase is preferably 0.1 μm or more, more preferably 0.15 μm or more, and more preferably 0.2 μm or more.

<Tensile Shear Adhesion Strength (MPa) Between Hydrogenated Block Copolymer (X) and Polypropylene-Based Resin (Y)>

A tensile shear test was performed according to JIS K 6850 (1999) with the hydrogenated block copolymer (X) set as an adhesive layer and the polypropylene-based resin (Y) set as an adherent, and the maximum load was divided by the bonding area and the obtained value was taken as the tensile shear adhesion strength (MPa) between the hydrogenated block copolymer (X) and the polypropylene-based resin (Y).

The method of the tensile shear test will be described below.

A sheet (with a width of 25 mm, a length of 10 mm, and a thickness of 0.3 mm) of the hydrogenated block copolymer (X) was interposed between two sheets (a width of 25 mm, a length of 40 mm, and a thickness of 3 mm) of the polypropylene-based resin (Y), and the sheets were heat-fused at 140° C. for 5 minutes under a non-pressurized condition with a bonding area of 250 mm$^2$, and the resulting sample was pulled with a tensile tester (5566 Tester manufactured by INSTRON, load capacity: 10 kN) in the direction parallel to the bonding surface at a rate of 500 mm/minute to measure the maximum load (N).

When the tensile shear adhesion strength (MPa) is preferably about 1.5 to 4.5, more preferably about 2 to 4, the bag-breaking strength tends to be high.

[Raw Material Polymers Used in Examples]

Detail or production methods of components used in Examples and Comparative Examples will be described below.

<Polypropylene-Based Resins (Y) and (Y')>

Polypropylene-based resin (Y-1): "SFC-750D" (manufactured by LOTTE CHEMICAL CORPORATION), propylene-butene random copolymer, MFR: 5.8 g/10 minutes (230° C., 21.6 N), melting point: 130° C., propylene content: 90% by mole Polypropylene-based resin (Y'-1): "SB-520Y" (manufactured by LOTTE CHEMICAL CORPORATION), propylene-ethylene random copolymer, MFR: 2.4 g/10 minutes (230° C., 21.6 N), melting point: 154° C., propylene content: 97% by mole Polypropylene-based resin (Y'-2): "PT-100" (manufactured by LCY CHEMICAL CORP.), homopolypropylene, MFR: 1.6 g/10 minutes (230° C., 21.6 N), melting point: 164° C., propylene content: 100% by mole Physical properties were also shown in Table 1.

TABLE 1

| Polypropylene-based resin (Y) | (Y-1) | (Y'-1) | (Y'-2) |
|---|---|---|---|
| Type | Propylene-butene random copolymer | Propylene-ethylene random copolymer | Homo-polypropylene |
| Melting point (° C.) | 130 | 154 | 164 |
| MFR [230° C., 21.6 N] (g/10 minutes) | 5.8 | 2.4 | 1.6 |
| Propylene content (% by mole) | 90 | 97 | 100 |
| Viscosity $\eta_{(Y)}$ (Pa · s) | 605 | — | — |

[Production of Hydrogenated Block Copolymer (X) and Hydrogenated Block Copolymer (W)]

Production Examples of hydrogenated block copolymers (X-1) and (W-1) to (W-5) used in Examples and Comparative Examples are shown below.

The amounts of compounds used in Production Examples are shown in Table 2.

Production Example 1: Production of Hydrogenated Block Copolymer (X)

Into a pressure resistant vessel purged with nitrogen and dried were put 50 kg of cyclohexane as a solvent and 133 g (corresponding to 14 g of sec-butyllithium) of sec-butyllithium (a 10.5 mass % cyclohexane solution) as an anionic polymerization initiator. After heating to 50° C., 1.75 kg of styrene (1) was added to effect polymerization for 1 hour, subsequently 9.0 kg of isoprene (1) was added at 40° C. to effect polymerization for 2 hours, and the temperature was further raised to 50° C. Then, 1.75 kg of styrene (2) was added to effect polymerization for 1 hour. 313 g of tetrahydrofuran was put as a Lewis base at 40° C., and 4.2 kg of isoprene (2) was added to effect polymerization for 2 hours, thereby obtaining a reaction liquid containing a polystyrene-polyisoprene-polystyrene-polyisoprene tetrablock copolymer.

To the reaction liquid, palladium carbon (amount of palladium supported: 5% by mass) as a hydrogenation catalyst was added in an amount of 5% by mass based on the block copolymer and a reaction was performed under conditions of a hydrogen pressure of 2 MPa and 150° C. for 10 hours.

After radiational cooling and pressure discharge, palladium carbon was removed by filtration, and the filtrate was concentrated and dried in vacuum to thereby obtain a hydrogenated polystyrene-polyisoprene-polystyrene-polyisoprene tetrablock copolymer (hereinafter referred to as hydrogenated block copolymer (X-1)). The obtained hydrogenated block copolymer (X-1) was evaluated for the physical properties according to the above methods. Note that the viscosity ratio [$\eta_{(X)}/\eta_{(Y-1)}$] was calculated as the ratio of the viscosity $\eta_{(X)}$ of the hydrogenated block copolymer to the viscosity $\eta_{(Y-1)}$ of the polypropylene-based resin (Y-1). The results are shown in Table 3.

Production Examples 2 to 5: Production of Hydrogenated Block Copolymer (X)

Hydrogenated block copolymers (X-2) to (X-5) were produced in the same manner as in Production Example 1 except for changing as shown in Table 2. The obtained hydrogenated block copolymers (X-2) to (X-5) were evaluated for the physical properties according to the above methods. The results are shown in Table 3.

Production Examples 6 to 8 and 10: Production of Hydrogenated Block Copolymer (W)

Hydrogenated block copolymers (W-1) to (W-3) and (W-5) were produced in the same manner as in Production Example 1 except for changing as shown in Table 2. The obtained hydrogenated block copolymers (W-1) to (W-3) and (W-5) were evaluated for the physical properties according to the above methods. The results are shown in Table 3.

Production Example 9: Production of Hydrogenated Block Copolymer (W-4)

Into a pressure resistant vessel purged with nitrogen and dried were put 50 kg of cyclohexane as a solvent, 76 g (corresponding to 8.0 g of sec-butyllithium) of sec-butyllithium (a 10.5 mass % cyclohexane solution) as an anionic polymerization initiator, and 313 g of tetrahydrofuran as a Lewis base. After heating to 50° C., 0.5 kg of styrene (1) was added to effect polymerization for 1 hour, subsequently a mixed liquid of 8.2 kg of isoprene (1) and 6.5 kg of butadiene (1) were added at 40° C. to effect polymerization for 2 hours, and the temperature was further raised to 50° C. Then, 1.5 kg of styrene (2) was added to effect polymerization for 1 hour, thereby obtaining a reaction liquid containing a polystyrene-poly(isoprene/butadiene)-polystyrene block copolymer.

To the reaction liquid, palladium carbon (amount of palladium supported: 5% by mass) was added as a hydrogenation catalyst in an amount of 5% by mass based on the block copolymer, and a reaction was performed under conditions of a hydrogen pressure of 2 MPa and 150° C. for 10 hours.

After radiational cooling and pressure discharge, palladium carbon was removed by filtration, and the filtrate was concentrated and dried in vacuum to thereby produce a hydrogenated block copolymer (W-4). The obtained hydrogenated block copolymer (W-4) was evaluated for the physical properties according to the above methods. The results are shown in Table 3.

TABLE 2

| | | X-1 Production Example 1 | X-2 Production Example 2 | X-3 Production Example 3 | X-4 Production Example 4 | X-5 Production Example 5 | W-1 Production Example 6 | W-2 Production Example 7 | W-3 Production Example 8 | W-4 Production Example 9 | W-5 Production Example 10 |
|---|---|---|---|---|---|---|---|---|---|---|---|
| Use amount (kg) | Cyclohexane | 50.0 | 50.0 | 50.0 | 50.0 | 50.0 | 50.0 | 50.0 | 50.0 | 50.0 | 50.0 |
| | sec-Butyllithium | 0.133 | 0.122 | 0.133 | 0.114 | 0.140 | 0.311 | 0.195 | 0.133 | 0.076 | 0.166 |
| | Styrene (1) | 1.75 | 1.50 | 1.75 | 1.50 | 1.50 | 2.50 | 2.50 | 1.75 | 0.50 | 1.50 |
| | Isoprene (1) | 9.00 | 5.25 | 6.70 | 3.00 | 5.48 | 11.65 | 11.65 | 11.50 | 8.20 | 13.70 |
| | Butadiene (1) | 0.00 | 4.30 | 0.00 | 2.46 | 4.48 | 0.00 | 0.00 | 0.00 | 6.50 | 0.00 |
| | Styrene (2) | 1.75 | 1.50 | 1.75 | 1.50 | .50 | 2.50 | 2.50 | 1.75 | 1.50 | 1.50 |
| | Isoprene (2) | 4.20 | 2.25 | 6.50 | 4.50 | 2.03 | 0.00 | 0.00 | 1.70 | 0.00 | 0.00 |
| | Butadiene (2) | 0.00 | 1.84 | 0.00 | 3.68 | 1.66 | 0.00 | 0.00 | 0.00 | 0.00 | 0.00 |
| | Tetrahydrofuran | 0.31 | 0.33 | 0.31 | 0.33 | 0.33 | 0.0 | 0.0 | 0.31 | 0.31 | 0.00 |

TABLE 3

| Hydrogenated block copolymer X | X-1 Production Example 1 | X-2 Production Example 2 | X-3 Production Example 3 | X-4 Production Example 4 | X-5 Production Example 5 | W-1 Production Example 6 | W-2 Production Example 7 | W-3 Production Example 8 | W-4 Production Example 9 | W-5 Production Example 10 |
|---|---|---|---|---|---|---|---|---|---|---|
| Polymer structure | ABAC | ABAC | ABAC | ABAC | ABAC | ABA | ABA | ABAC | ACA | ABA |
| (A1) + (A2) (% by mass) | 21 | 18 | 21 | 18 | 18 | 30 | 30 | 21 | 12 | 18 |
| (B) (% by mass) | 54 | 57 | 40 | 33 | 60 | 70 | 70 | 69 | 0 | 72 |
| (C) (% by mass) | 25 | 25 | 39 | 49 | 22 | 0 | 0 | 10 | 88 | 0 |
| (C)/{(B) + (C)} [mass ratio] | 32/100 | 30/100 | 49/100 | 60/100 | 27/100 | 0/100 | 0/100 | 13/100 | 100/100 | 0/100 |
| Vinyl bond content of (B) (% by mole) | 6 | 6 | 6 | 6 | 6 | 6 | 6 | 6 | — | 7 |
| Vinyl bond content of (C) (% by mole) | 57 | 60 | 60 | 60 | 60 | — | — | 65 | 60 | — |
| Weight average molecular weight [Mw] of (A1) | 7,500 | 7,500 | 7,500 | 8,000 | 6,500 | 5,000 | 7,800 | 8,000 | 4,000 | 5,600 |
| Weight average molecular weight [Mw] of (A2) | 7,500 | 7,500 | 7,500 | 8,000 | 6,500 | 5,000 | 7,800 | 8,000 | 12,000 | 5,600 |
| Weight average molecular weight [Mw] of (B) | 62,900 | 81,900 | 39,800 | 50,200 | 73,000 | 40,200 | 58,400 | 88,200 | — | 84,800 |
| Weight average molecular weight [Mw] of (C) | 29,100 | 35,100 | 38,800 | 73,800 | 27,000 | — | — | 12,800 | 131,200 | — |
| Weight average molecular weight [Mw] of hydrogenated block copolymer | 107,000 | 132,000 | 94,000 | 140,000 | 113,000 | 50,200 | 74,000 | 117,000 | 147,300 | 96,000 |
| Molecular weight distribution [Mw/Mn] of hydrogenated block copolymer | 1.04 | 1.04 | 1.04 | 1.04 | 1.03 | 1.03 | 1.06 | 1.02 | 1.06 | 1.04 |
| Hydrogenation rate of (B) and (C) (% by mole) | 96 | 95 | 94 | 93 | 97 | 99 | 99 | 98 | 90 | 98 |
| Viscosity η(X) (Pa · s) | 1815 | 1900 | 541 | 700 | 1900 | 82 | 2639 | 3380 | 1146 | 1042 |
| Viscosity ratio [η(X)/η(Y · 1)] | 3.00 | 3.10 | 0.89 | 1.16 | 3.10 | 0.14 | 4.36 | 5.58 | 1.89 | 1.72 |
| Size of dispersed phase (μm) | 0.39 | 0.35 | 0.35 | 0.23 | 0.37 | 0.76 | 0.48 | 0.5 | <0.1 | 0.55 |
| Tensile shear adhesion strength between (X) and (Y · 1) (MPa) | 3.86 | 3.44 | 2.78 | 2.99 | 3.01 | 4.09 | 4.01 | 3.64 | 5.81 | 2.61 |

Examples 1 to 5, Comparative Examples 1 to 4: Production of Laminate Film

Using materials shown in Table 4, materials for an inner layer and materials for an outer layer were molded at the respective blending ratios shown in Table 4 using a 30-mm T-die single screw extruder set at 230° C. to mold a two-layer laminate body having a thickness of about 200 μm, thereby obtaining a laminate film. The thicknesses of the inner layer and the outer layer were respectively adjusted to about 20 μm and about 180 μm by changing the screw rotation number and the winding rate.

Examples 6 to 10, Comparative Examples 5 to 9: Production of Three-Layer Laminate Film Using materials shown in Table 5, materials for an inner layer, materials for an intermediate layer, and materials for an outer layer were molded at the respective blending ratios shown in Table 5 using a water cooling down draft inflation molding apparatus under conditions of a resin temperature of 230° C., a cooling water temperature of 20° C., and a line velocity of 9 m/minute into a three-layer laminate body (a film for a liquid-packaging container) having a thickness of 180 μm. The thicknesses of the inner layer, the intermediate layer, and the outer layer were respectively made to 20 μm, 120 μm, and 40 μm.

Laminate films having a thickness of 200 μm or 180 μm produced in Examples and Comparative Examples are measured and evaluated according to the following methods.

<Tensile Impact Value (kJ/m$^2$)>

The produced laminate film was cut into strips having a width of 15 mm, and two strips were superposed so that the inner layers were in contact with each other and were heat-fused under conditions of 140° C. and 0.15 MPa for 1 second, and the resultant was allowed to stand under conditions of room temperature and a humidity of 50% for 16 hours or more. The resultant was set in a digital impact tester (DG-TB, manufactured by Toyo Seiki Seisaku-sho Ltd.) with the heat-fused portion up so that the cross section of the laminate film was in an inverted T shape, and was hit with a hummer at a rate of 3.8 m/s in such a direction that the heat-fused portion is peeled to damage the heat-fused portion by the hummer. Then the tensile impact value (kJ/m$^2$) of the heat-sealed portion was checked. The results are shown in Table 4. The higher the tensile impact value, the higher the bag-breaking strength.

<Method for Evaluating Bag-Breaking Strength of Liquid-Packaging Container>

The bag-breaking strength was evaluated by the following test. Specifically, the laminate film obtained in Examples 6 to 10 or Comparative Examples 5 to 9 was cut into sheets having a size of 20 cm x 15.5 cm, and two sheets were stacked so that the inner layers face each other, and three sides among the four sides were heat-sealed under conditions of 140° C., a gauge pressure of 0.4 MPa, and a heating time of 1 second. Next, about 500 cc of water was poured from one side that was not sealed and the one side was heat-sealed under the same condition as above to produce a liquid-packaging container having a content of 500 cc.

The resulting liquid-packaging container was gently placed on an iron plate under an environment of 23° C., and then an iron plate having a weight of 2.5 kg was dropped on the liquid-packaging container from a height of 5 cm. When water was not leaked from the liquid-packaging container, the height was increased in steps of 5 cm and a drop of the iron plate was repeated. The height of the iron plate when water leakage occurred was taken as the bag breakage height. The test was performed 10 times for each example to determine the probability that the bag breakage height was 90 cm or more, and the probability was taken as the bag-breaking strength. The results are shown in Table 5.

When the bag breakage height is 90 cm or more, the bag hardly breaks in transportation or in handling. The probability that the bag breakage height is 90 cm or more is preferably 50% or more, more preferably 70% or more, and further preferably 80% or more.

TABLE 4

| | | | Example | | | | | Comparative Example | | | |
|---|---|---|---|---|---|---|---|---|---|---|---|
| | | | 1 | 2 | 3 | 4 | 5 | 1 | 2 | 3 | 4 |
| Outer layer [resin composition (P)] | Y'-1 | parts by mass | 65 | 65 | 65 | 65 | 65 | 65 | 65 | 65 | 65 |
| | W-4 | parts by mass | 35 | 35 | 35 | 35 | 35 | 35 | 35 | 35 | 35 |
| Inner layer [resin composition (Z)] | Y-1 | parts by mass | 70 | 70 | 70 | 70 | 70 | 70 | 70 | 70 | 70 |
| | X-1 | parts by mass | 30 | | | | | | | | |
| | X-2 | parts by mass | | 30 | | | | | | | |
| | X-3 | parts by mass | | | 30 | | | | | | |
| | X-4 | parts by mass | | | | 30 | | | | | |
| | X-5 | parts by mass | | | | | 30 | | | | |
| | W-1 | parts by mass | | | | | | 30 | | | |
| | W-2 | parts by mass | | | | | | | 30 | | |
| | W-3 | parts by mass | | | | | | | | 30 | |
| | W-4 | parts by mass | | | | | | | | | 30 |
| Evaluation | Tensile impact value of laminate film | (kJ/m²) | 3356 | 3450 | 3220 | 3100 | 3456 | 826 | 2334 | 2669 | 190 |

TABLE 5

| | | | Examples | | | | | Comparative Examples | | | | |
|---|---|---|---|---|---|---|---|---|---|---|---|---|
| | | | 6 | 7 | 8 | 9 | 10 | 5 | 6 | 7 | 8 | 9 |
| Outer layer [resin composition (P)] | Y'-2 | parts by mass | 95 | 95 | 95 | 95 | 95 | 95 | 95 | 95 | 95 | 95 |
| | W-1 | parts by mass | 5 | 5 | 5 | 5 | 5 | 5 | 5 | 5 | 5 | 5 |
| Intermediate layer [resin composition (P)] | Y'-1 | parts by mass | 65 | 65 | 65 | 65 | 65 | 65 | 65 | 65 | 65 | 65 |
| | W-4 | parts by mass | 35 | 35 | 35 | 35 | 35 | 35 | 35 | 35 | 35 | 35 |
| Inner layer [resin composition (Z)] | Y-1 | parts by mass | 70 | 70 | 70 | 70 | 70 | 70 | 70 | 70 | 70 | 70 |
| | X-1 | parts by mass | 30 | | | | | | | | | |
| | X-2 | parts by mass | | 30 | | | | | | | | |
| | X-3 | parts by mass | | | 30 | | | | | | | |
| | X-4 | parts by mass | | | | 30 | | | | | | |
| | X-5 | parts by mass | | | | | 30 | | | | | |
| | W-1 | parts by mass | | | | | | 30 | | | | |
| | W-2 | parts by mass | | | | | | | 30 | | | |
| | W-3 | parts by mass | | | | | | | | 30 | | |
| | W-4 | parts by mass | | | | | | | | | 30 | |
| | W-5 | parts by mass | | | | | | | | | | 30 |
| Bag-breaking strength of liquid-packaging container | Probability that bag breakage height is 90 cm or more (%) | | 80 | 90 | 80 | 80 | 90 | 40 | 30 | 30 | 20 | 20 |

<Consideration>

As is apparent from the results of Examples 1 to 5, the liquid-packaging container of the present invention produced by using a hydrogenated block copolymer in which at least one of the polymer blocks (B) and (C) is present between the polymer blocks (A1) and (A2), the mass ratio [(C)/{(B)+(C)}] of the polymer block (C) to the sum of the polymer blocks (B) and (C) being 26/100 to 63/100, has a high tensile impact value of the laminate film, and thus is superior in the bag-breaking strength. The liquid-packaging containers obtained in Examples 6 to 10 are also superior in the bag-breaking strength. This is because the liquid-packaging containers have a low tensile shear adhesion strength between the hydrogenated block copolymer (X) and the polypropylene-based resin (Y) and also have a size of the dispersed phase formed of the hydrogenated block copolymer (X) in an appropriate range, leading to an increase in the energy absorption by cohesive fracture.

On the other hand, it is found that Comparative Examples 1 to 4 in which the hydrogenated block copolymer of the present invention is not used show a low tensile impact value of the laminate film and are inferior in the bag-breaking strength. The liquid-packaging containers obtained in Comparative Example 5 to 9 also have a low bag-breaking strength. This is considered because, in Comparative Examples, interfacial peeling and film fracture are likely to occur when the film is broken and the effect of increasing the bag-breaking strength by cohesive fracture is insufficient.

INDUSTRIAL APPLICABILITY

The liquid-packaging container of the present invention can be used in various applications. For example, the liquid-packaging container can be effectively used, not only as such a medical container as described above, but also as, for example, a food packaging container for packaging a retort food, mayonnaise, ketchup, soft drink, ice cream, or the like.

The invention claimed is:

1. A hydrogenated block copolymer, comprising:
polymer blocks (A1) and (A2) each comprising an aromatic vinyl compound-derived structural unit, and
polymer blocks (B) and (C) each comprising a conjugated diene compound-derived structural unit,
wherein at least one of the polymer blocks (B) and (C) is present between the polymer blocks (A1) and (A2),
the hydrogenated block copolymer has
a total content of the polymer blocks (A1) and (A2) of from 5 to 30% by mass,
a 3,4-bond and 1,2-bond content in the polymer block (B) of from 1 to 40% by mole,
a 3,4-bond and 1,2-bond content in the polymer block (C) of from 50 to 100% by mole, and
a mass ratio [(C)/{(B)+(C)}] of the polymer block (C) to the sum of the polymer blocks (B) and (C) of from 26/100 to 63/100.

2. The hydrogenated block copolymer according to claim 1, wherein the hydrogenated block copolymer is constituted of four blocks of the polymer blocks (A1) and (A2) and the polymer blocks (B) and (C).

3. The hydrogenated block copolymer according to claim 1, wherein the polymer blocks (A1) and (A2) and the polymer blocks (B) and (C) are present in an order of (A1)-(B)-(A2)-(C).

4. The hydrogenated block copolymer according to claim 1, wherein the hydrogenated block copolymer has a weight average molecular weight of from 60,000 to 500,000.

5. A resin composition (Z), comprising:
a hydrogenated block copolymer (X) that is the hydrogenated block copolymer according to claim 1 and
a polypropylene-based resin (Y),
wherein the hydrogenated block copolymer (X) and the polypropylene-based resin (Y) satisfy a condition, in which when 30 parts by mass of the hydrogenated block copolymer (X) and 70 parts by mass of the polypropylene-based resin (Y) are kneaded under conditions of 230° C. and a shear rate of 30 to 150 s$^{-1}$, a sea-island structure in which the hydrogenated block copolymer (X) is a dispersed phase is formed, the dispersed phase having a size of 0.1 μm or more and 1.0 μm or less.

6. A resin composition (Z), comprising:
a hydrogenated block copolymer (X) that is the hydrogenated block copolymer according to claim 1 and
a polypropylene-based resin (Y),
wherein the resin composition (Z) has a mass ratio [(Y)/{(X)+(Y)}] of the polypropylene-based resin (Y) to the sum of the hydrogenated block copolymer (X) and the polypropylene-based resin (Y) of from 61/100 to 95/100.

7. The resin composition according to claim 5, wherein the hydrogenated block copolymer (X) has a viscosity ($\eta_{(X)}$) and the polypropylene-based resin (Y) has a viscosity ($\eta_{(Y)}$) at 230° C. and at a shear rate of 60 s$^{-1}$, and the resin composition has a ratio [$\eta_{(X)}/\eta_{(Y)}$] of the viscosity ($\eta_{(X)}$) to the viscosity ($\eta_{(Y)}$) of from 0.6 to 8.0.

8. A film, comprising the resin composition according to claim 5.

9. A liquid-packaging container, comprising the film according to claim 8.

10. The liquid-packaging container according to claim 9, wherein the film has a structure of at least two layers including an inner layer and an outer layer,
the inner layer comprises the resin composition (Z), and
the outer layer comprises a resin composition (P) that comprises 60% by mass or more of a polypropylene-based resin (Y') having a propylene-derived structural unit content of 60% by mole or more.

11. The liquid-packaging container according to claim 9, wherein the film has a structure of three or more layers including at least one intermediate layer between an inner layer and an outer layer,
either or both of the inner layer and the intermediate layer comprises the resin composition (Z), comprises, and
the outer layer comprises a resin composition (P) that comprises 60% by mass or more of a polypropylene-based resin (Y') having a propylene-derived structural unit content of 60% by mole or more.

12. The liquid-packaging container according to claim 11, wherein the inner layer has a thickness in the range of from 5 to 30 μm, the intermediate layer has a thickness in the range of from 90 to 300 μm, and the outer layer has a thickness in the range of from 15 to 120 μm.

13. The liquid-packaging container according to claim 11, wherein the inner layer comprises a resin component having a melting point $MP_{in}$ and the intermediate layer comprises a resin component having a melting point $MP_{mid}$, and
the melting point $MP_{in}$ and the melting point $MP_{mid}$ satisfy formula:

$$MP_{in} < MP_{mid}.$$

14. The liquid-packaging container according to claim 10, wherein the inner layer comprises the resin composition (Z) having a melting point $MP_Z$ and the outer layer comprises the resin composition (P) having a melting point $MP_P$, and the melting point $MP_Z$ and the melting point $MP_P$ satisfy formula (2):

$$0 < MP_P - MP_Z \leq 50 \qquad \text{formula (2).}$$

15. A medical tool, comprising the liquid-packaging container according to claim 9.

* * * * *